(12) United States Patent
Maeder

(10) Patent No.: US 7,188,795 B2
(45) Date of Patent: Mar. 13, 2007

(54) FISHING REEL

(75) Inventor: Andrew Maeder, Moana (NZ)

(73) Assignee: Strike Technology Limited, Greymouth (NZ)

( * ) Notice: Subject to any disclaimer, the term of this patent is extended or adjusted under 35 U.S.C. 154(b) by 22 days.

(21) Appl. No.: 10/450,018

(22) PCT Filed: Dec. 4, 2001

(86) PCT No.: PCT/NZ01/00266

§ 371 (c)(1),
(2), (4) Date: Nov. 18, 2003

(87) PCT Pub. No.: WO02/45502

PCT Pub. Date: Jun. 13, 2002

(65) Prior Publication Data

US 2004/0069886 A1    Apr. 15, 2004

(30) Foreign Application Priority Data

Dec. 8, 2000    (NZ) .................................... 508732

(51) Int. Cl.
*A01K 89/00* (2006.01)
*A01K 89/15* (2006.01)
(52) U.S. Cl. ...................... 242/322; 242/224
(58) Field of Classification Search .............. 242/322, 242/245, 246, 248, 306, 318, 323, 405.2, 242/406, 127, 129.7
See application file for complete search history.

(56) References Cited

U.S. PATENT DOCUMENTS

| | | | |
|---|---|---|---|
| 1,401,096 A * | 12/1921 | Neudeck .................... 43/19.2 |
| 2,425,492 A | 8/1947 | Severson | |
| 2,752,717 A * | 7/1956 | Lind .............................. 43/20 |
| 3,143,316 A * | 8/1964 | Shapiro ................... 242/405.3 |
| 3,604,658 A * | 9/1971 | Nurmse et al. ............. 242/265 |
| 4,084,342 A | 4/1978 | Philip | |
| 4,124,174 A * | 11/1978 | Kelly .......................... 242/246 |
| 4,262,857 A * | 4/1981 | Gilbert ........................ 242/323 |
| 4,821,448 A | 4/1989 | Lindaberry | |
| 5,036,616 A * | 8/1991 | Wilsey ........................ 43/26.1 |
| 5,086,580 A | 2/1992 | Redding | |
| 5,160,099 A | 11/1992 | Furomoto | |
| 5,540,010 A | 7/1996 | Aragona | |
| 6,056,223 A * | 5/2000 | Kirby .......................... 242/306 |
| 6,311,914 B1 * | 11/2001 | Tsutsumi ..................... 242/322 |
| 6,364,231 B1 * | 4/2002 | Hirayama et al. ........... 242/322 |

FOREIGN PATENT DOCUMENTS

NZ    229496    10/1997

* cited by examiner

*Primary Examiner*—Emmanuel Marcelo
*Assistant Examiner*—Evan Langdon
(74) *Attorney, Agent, or Firm*—Snell & Wilmer, L.L.P.

(57) ABSTRACT

A fishing reel including a spool (5) for storing and dispensing line, and a winding mechanism for winding the line onto the spool (5) about a winding axis, the spool (5) is releasably secured in any one of a plurality of positions, each eccentrically offset from the winding axis to a different degree. In further embodiments a spool having an eccentrically positioned bore, a spindle positioned along an axis offset from the winding axis, the spindle being located within the bore of the spool, and a clutch releasably securing the spool in a desired position with respect to the spindle.

25 Claims, 16 Drawing Sheets

FISHING REEL

FIELD OF THE INVENTION

The present invention relates to a fishing reel and more particularly to a fishing reel that is configured for enhanced fishing with lures. The spool of the fishing reel is movable between one or more eccentric position to a substantially concentric position.

BACKGROUND OF THE INVENTION

When fishing with a lure or spinning, it is desirable to be able to make the lure move erratically to more accurately imitate the motion of live bait. This can be achieved in part by the design of the lure itself which may be configured to spin, weave and/or dive within the water.

When fishing from a stationary boat or shore, the movement of the lure can be further enhanced by a process commonly known as "jigging" in which the angler regularly flicks the rod quickly backwards while winding in the line, thereby causing the lure to periodically accelerate and decelerate as it is reeled in.

While this method may be effective, particularly when fishing with larger lures, it takes considerable skill and effort and is not really practical when trying to simulate the fast darting movements of smaller bait.

U.S. Pat. No. 2,425,492 discloses a fishing reel in which the spool is movable between an eccentric and a concentric position. Line is wound onto the reel by rotating the spool. In the eccentric position "jigging" can be effected. The spool can only be positioned in one eccentric position and the point at which the spool moves from the eccentric to concentric position is preset and cannot be adjusted by the user. This restricts a user from setting the desired degree of eccentricity to achieve a desired movement of a lure and does not allow a user to set the force on the line required to move the spool from the eccentric to concentric position. The construction is complex as implemented in a fishing reel having a rotating reel.

It is an object of the invention to provide a fishing reel that overcomes or ameliorates one or more disadvantages of the prior art or which at least offers a useful alternative.

DISCLOSURE OF THE INVENTION

According to a first aspect of the invention there is provided a fishing reel including:

a spool for storing and dispensing line; and a winding mechanism for winding line onto the spool about a winding axis, wherein the spool may be releasably secured in any one of a plurality of positions, each eccentrically offset from the winding axis to a different degree.

According to another aspect there is provided a fishing reel including:

a spool for storing and dispensing line having an eccentrically positioned bore therein;

a winding mechanism for winding line onto the spool about a winding axis;

a spindle positioned along an axis offset from the winding axis, the spindle being located within the bore of the spool; and a clutch for releasably securing the spool in a desired position with respect to the spindle.

According to a further aspect there is provided a fishing reel including:

a spool for storing and dispensing line a winding mechanism for winding line onto the spool about a winding axis;

said spool being mounted for selective movement between a first position wherein the axis of the spool is eccentrically offset from the winding axis and a second position wherein the axis of the spool is substantially concentric with the winding axis; and a clutch enabling adjustment of the force required to move the spool from the first to the second position.

According to yet a further aspect of the invention there is provided a fishing reel including:

a spool for storing and dispensing line; and a winding mechanism including an arm rotatable about a winding axis for winding line onto the spool, said spool being mounted for selective movement between a first position wherein the axis of the spool is eccentrically offset from the winding axis and a second position wherein the axis of the spool is substantially concentric with the winding axis.

Using a reel of the invention a lure can be wound in with the spool in the first eccentric position which causes the speed of the retracting line and lure to accelerate and decelerate with each rotation about the winding axis. Once there has been a "hit" and a fish is hooked, the spool automatically moves to the second position, which is substantially concentric with the winding axis, thus enabling the hooked fish to be reeled with the spool in the normal concentric location that provides an even speed winding action.

The spool is preferably releasably securable in a plurality of positions, each eccentrically offset from the winding axis to a different extent to allow a user to control the amount of "jigging". The spool is preferably continuously adjustable between a most eccentric position and a concentric position. Stops on the spool and spool base (or another fixed part of the reel) may limit the range of movement of the spool with respect to the reel. Preferably the range of movement of the spool is limited to less than 180°.

In the preferred construction the spool has an eccentrically offset bore and is rotatable about a spindle positioned along an axis offset from the winding axis. Preferably, the spool mounting is configured to enable a self centring action from an eccentric to a concentric position when the load on the line exceeds a set threshold.

A clutch is preferably provided for securing the spool in a desired eccentric position and setting the load threshold for allowing movement between the eccentric to the concentric position. The clutch preferably includes a frictional surface between the spool and a spool base. A variable compression means is preferably provided to allow adjustment of the compressive force between the spool and the spool base. The variable compression means preferably consists of an adjustable nut which may be positioned along a threaded shaft to vary the compressive force applied by a spring.

The knob may include means for visually indicating the compressive force applied by the spring.

The reel may include a clicker in the form of a flexible strip mounted to a stationary part of the wheel which engages projections of a rotating part of the reel or vice versa.

There is further provided a spoof and spool base for a fishing reel wherein the spool may be releasably secured in any one of a plurality of positions, each eccentrically offset from the winding axis to a different degree.

There is still further provided a spool and spool base for a fishing reel wherein the spool base includes an eccentrically located spindle extending therefrom and the spool includes an eccentrically located bore for receiving the spindle.

BRIEF DESCRIPTION OF THE DRAWINGS

Preferred embodiments of the invention will now be described by way of example only with reference to the accompanying drawings in which.

DETAILED DESCRIPTION

Figure 1:
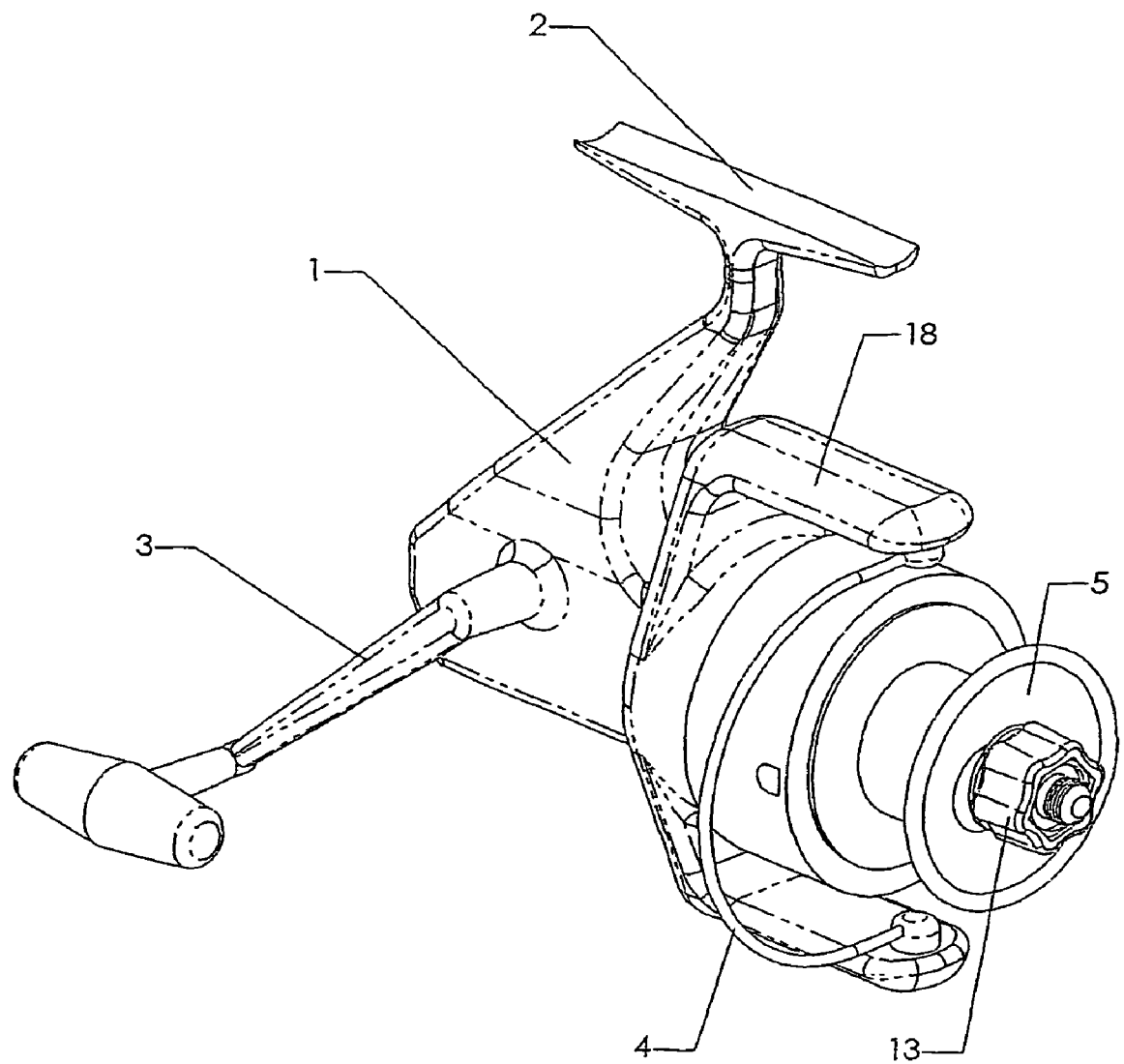
FIG. 1: shows a front side perspective view of a fishing reel according to a first embodiment.
Figure 2:
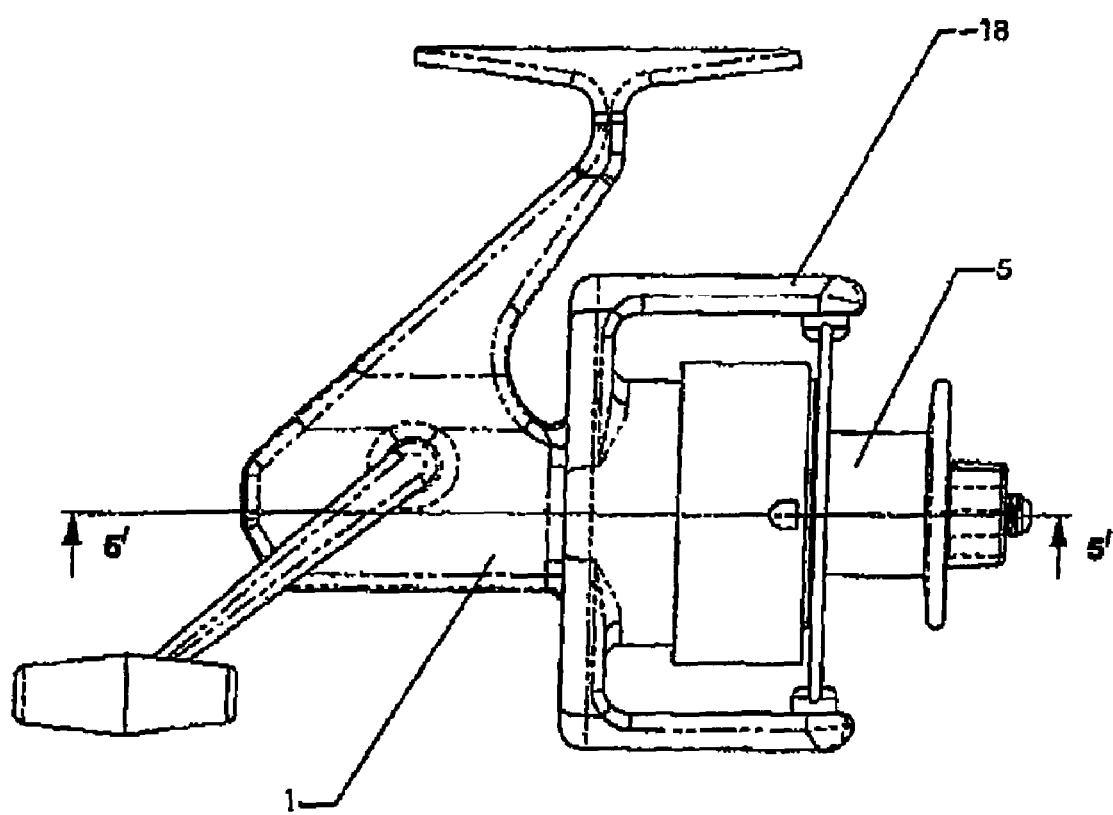
FIG. 2: shows a side view of the fishing reel of FIG. 1.
Figure 3:
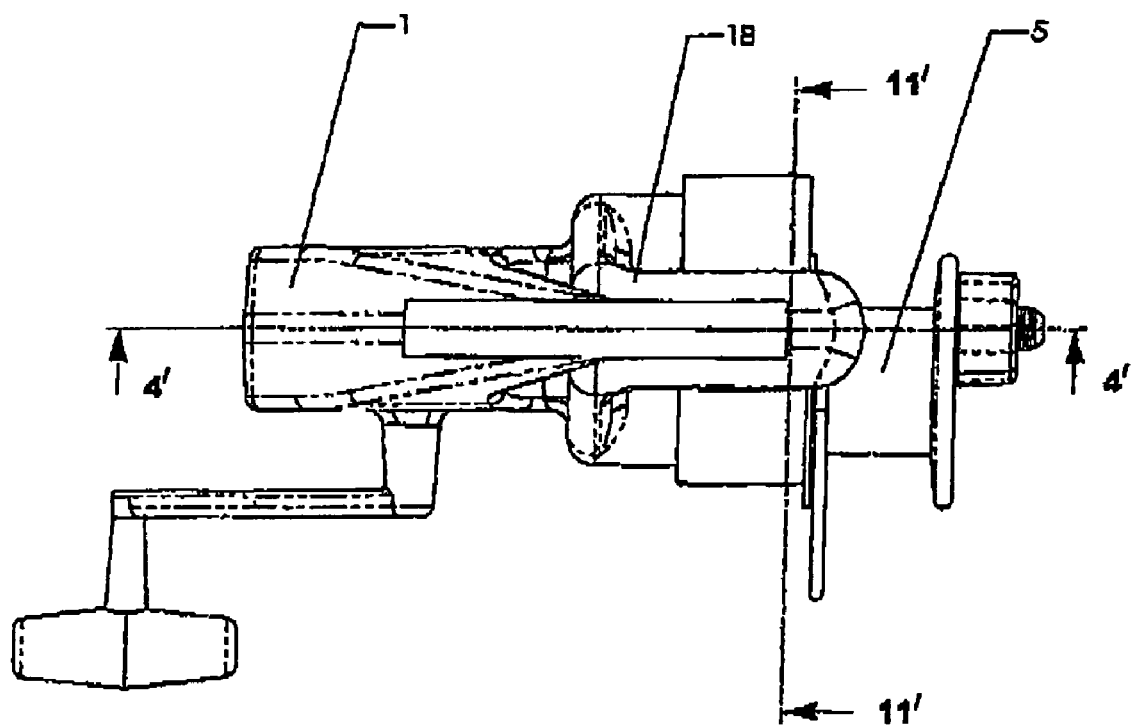
FIG. 3: shows a top view of the fishing reel of FIGS. 1 and 2.
Figure 4:
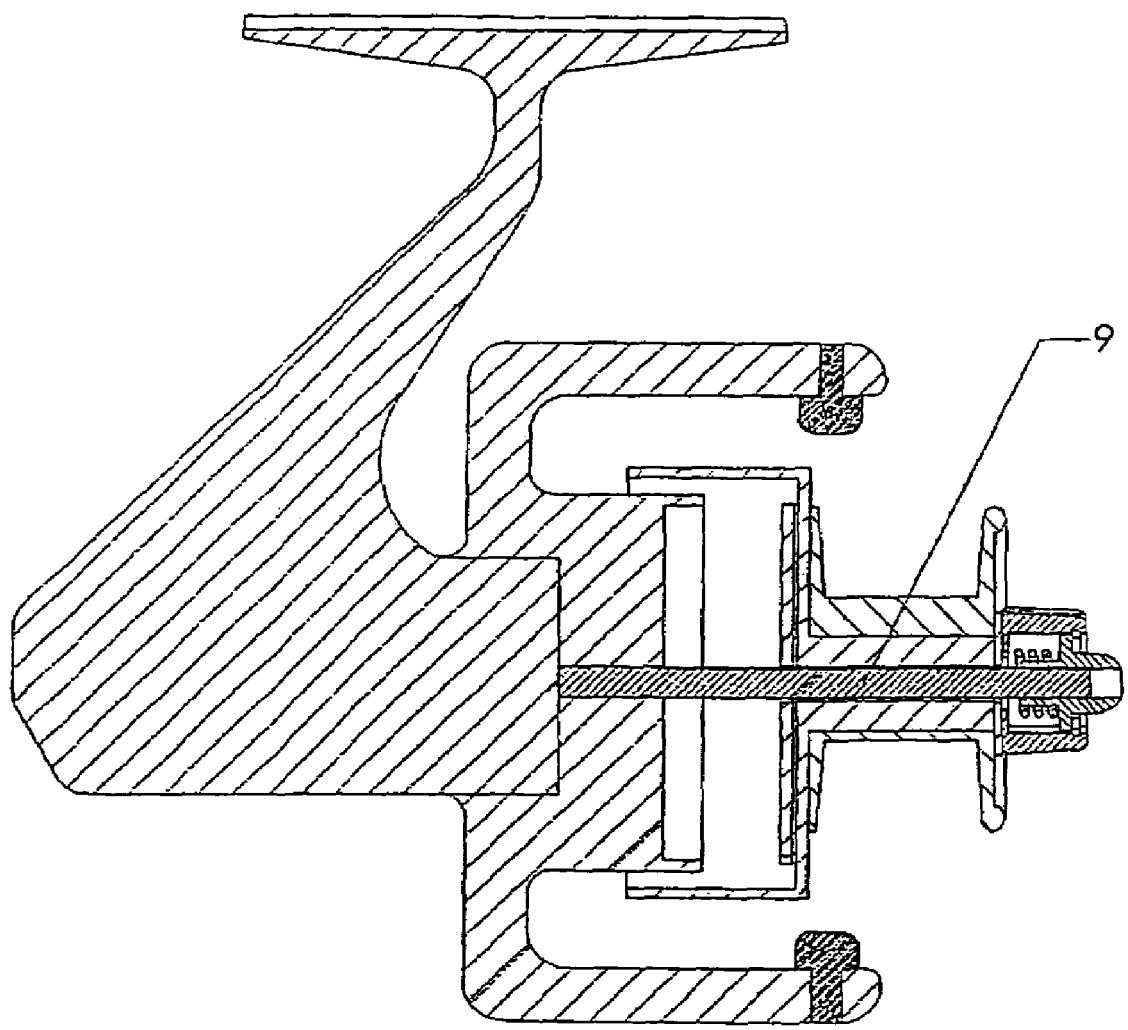
FIG. 4: shows a side cross-sectional view along line A—A.
Figure 5:
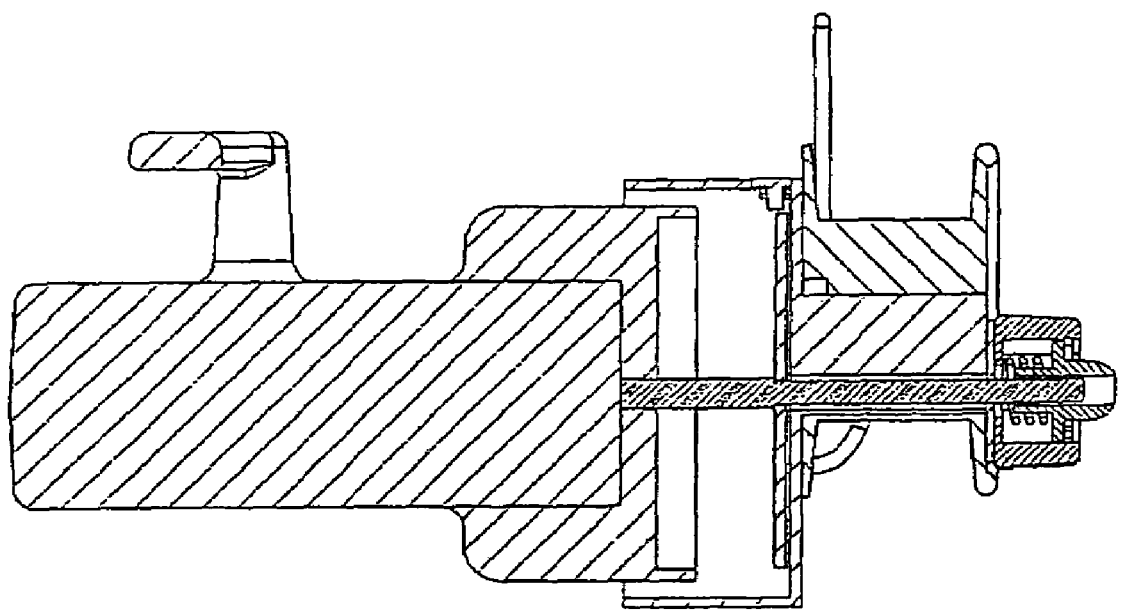
FIG. 5: shows a top cross-sectional view along section B—B.

Referring firstly to FIGS. 1–12 a reel according to a first embodiment will be described. The fishing reel includes a body part 1 having a foot 2 for securing the reel to a fishing rod. Rotation of crank 3 causes gear housing 18 and bale arm 4 to rotate about spool 5. When the bale arm 4 is in its closed position (as shown) rotation of bale arm 4 about spool 5 causes line to be wound upon spool 5 or unwound therefrom depending upon the direction of rotation.

Figure 8:
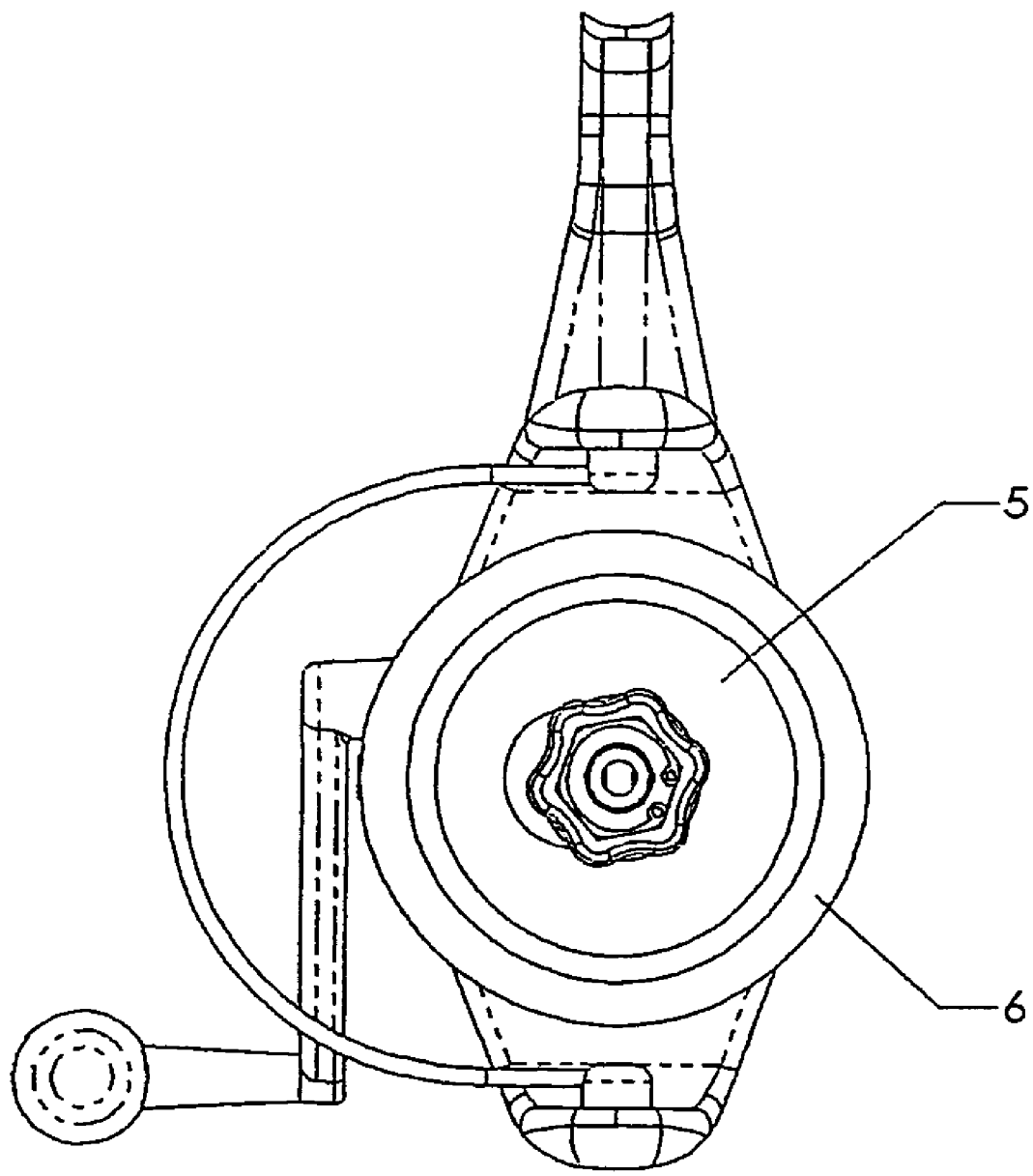
FIG. 8: shows a front view of the fishing reel of FIGS. 1–7 with the spool in a concentric position.
Figure 9:
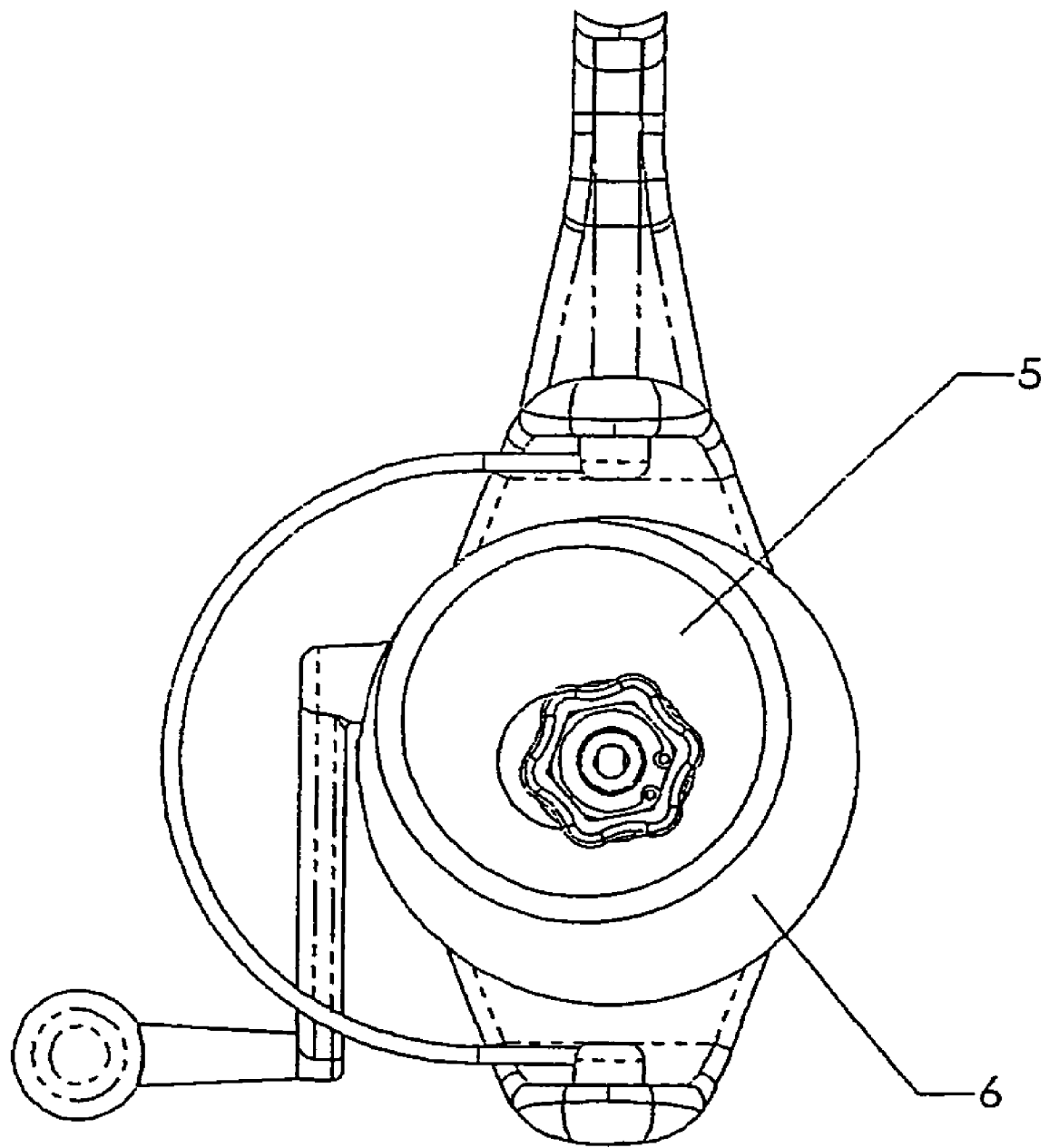
FIG. 9: shows a front view with the spool in an eccentric position.
Figure 10A:
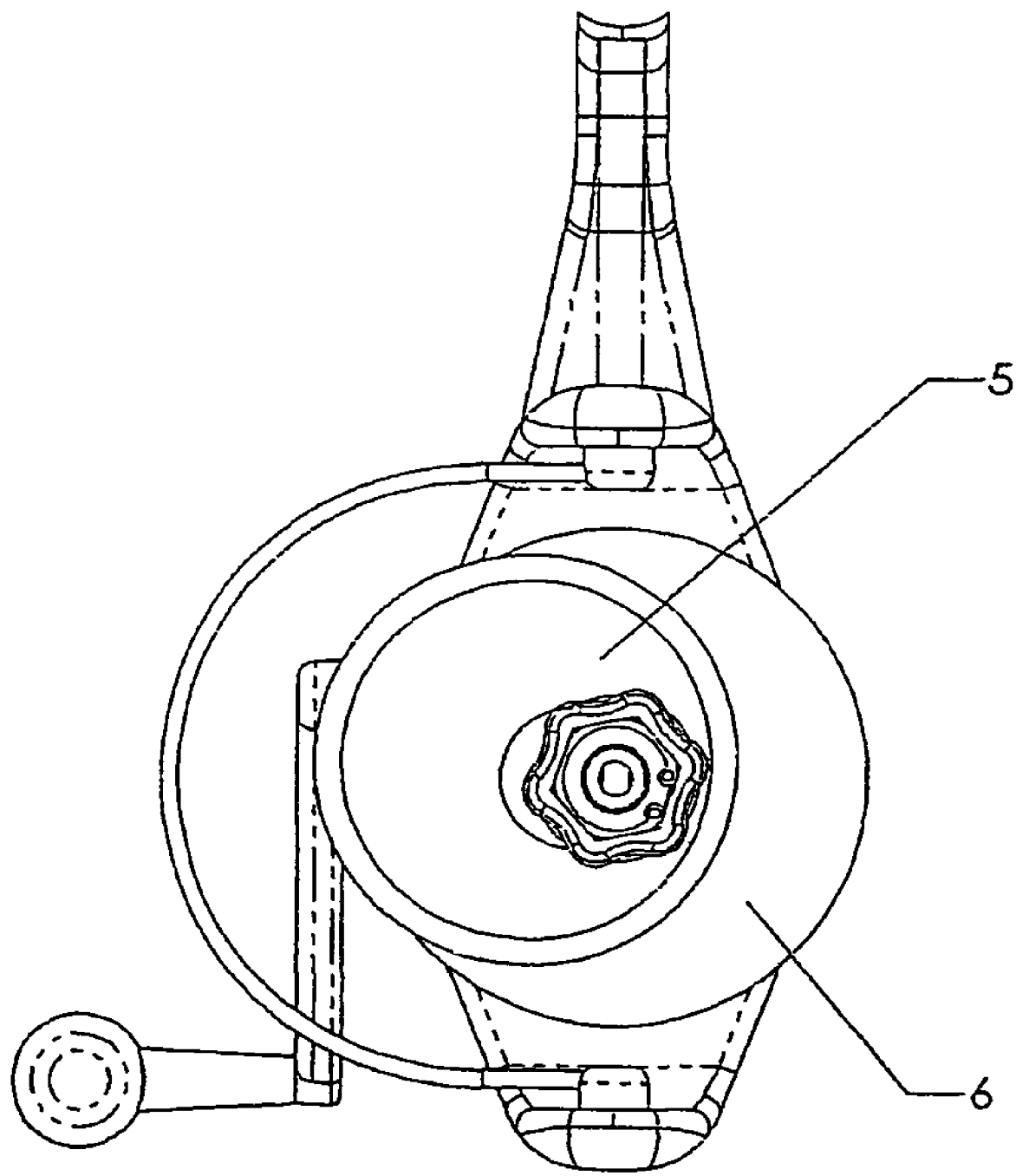
FIG. 10A: shows a front view of the fishing reel of FIGS. 1–9 with the spool in a most eccentric position.

When spool 5 is in a substantially concentric position (as shown in FIGS. 1 and 8) the line is wound at a relatively even rate upon spool 5. When spool 5 is moved from a substantially concentric position (as shown in FIG. 8) to substantially eccentric position (as shown in FIGS. 9 and 10A) the winding characteristics change. As the position of spool 5 becomes increasingly eccentric the speed of retraction of the line accelerates and decelerates with each rotation about the winding axis. This causes a lure attached to the line to accelerate and decelerate accordingly. This allows movement of the lure, commonly known as "jigging", to be varied according to the extent to which spool 5 is eccentrically positioned.

Figure 6:
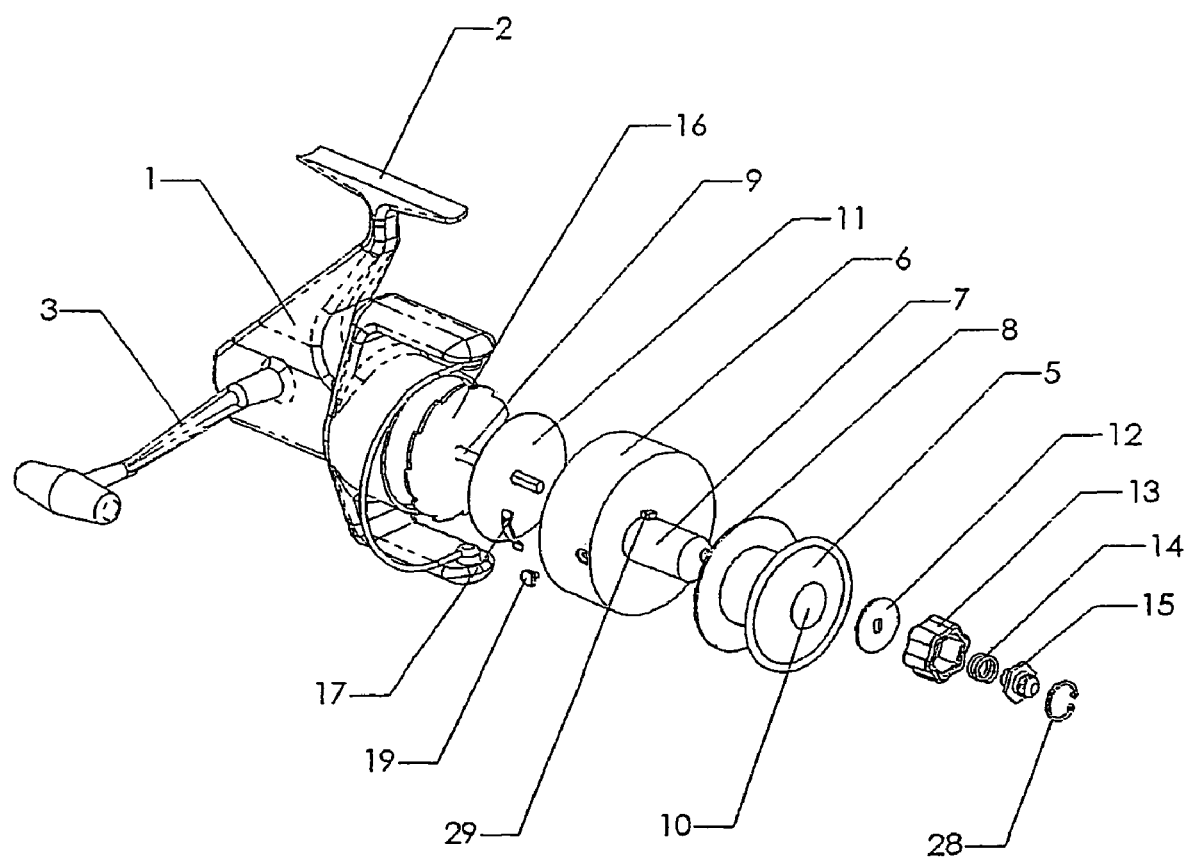
FIG. 6: shows a front exploded view of the fishing reel of FIGS. 1–5.
Figure 7:
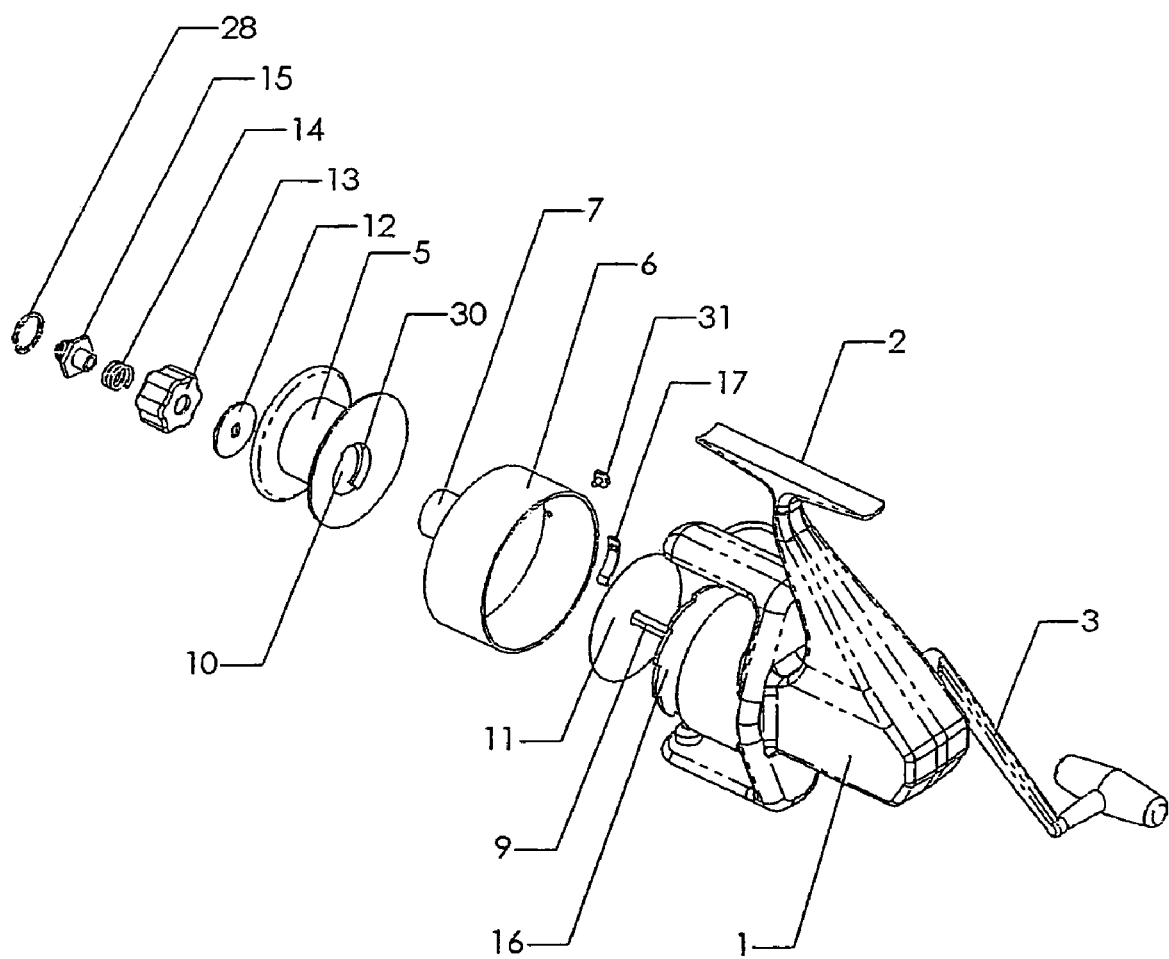
FIG. 7: shows a rear exploded view of the fishing reel of FIGS. 1–6.

Referring now to FIG. 6 the mechanism for achieving eccentric positioning of spool 5 will be described. Spool base 6 has a spindle 7 extending therefrom. Spindle 7 is eccentrically positioned with respect to central bore 8. Shaft 9 passes through bore 8 to mount spool base 6 to the reel. Shaft 9 extends along the winding axis about which line is wound onto spool 5.

Spool 5 has an eccentrically located bore 10. Spindle 7 locates within bore 10 and spool 5 is rotatable about spindle 7. In the position shown in FIG. 8 spindle 7 and bore 10 are offset from the winding axis (along the line of shaft 9) to the same extent. In this relative position spool 5 is substantially concentric with the winding axis, as shown in FIG. 8. If spool 5 is rotated by 180° from this initial position the spool becomes offset from the winding axis by the displacement of bore 10 from the winding axis plus the displacement of spindle 7 from the winding axis to assume the position shown in FIG. 10A. In this position the greatest acceleration and deceleration of line will be achieved during winding.

Figure 10B:
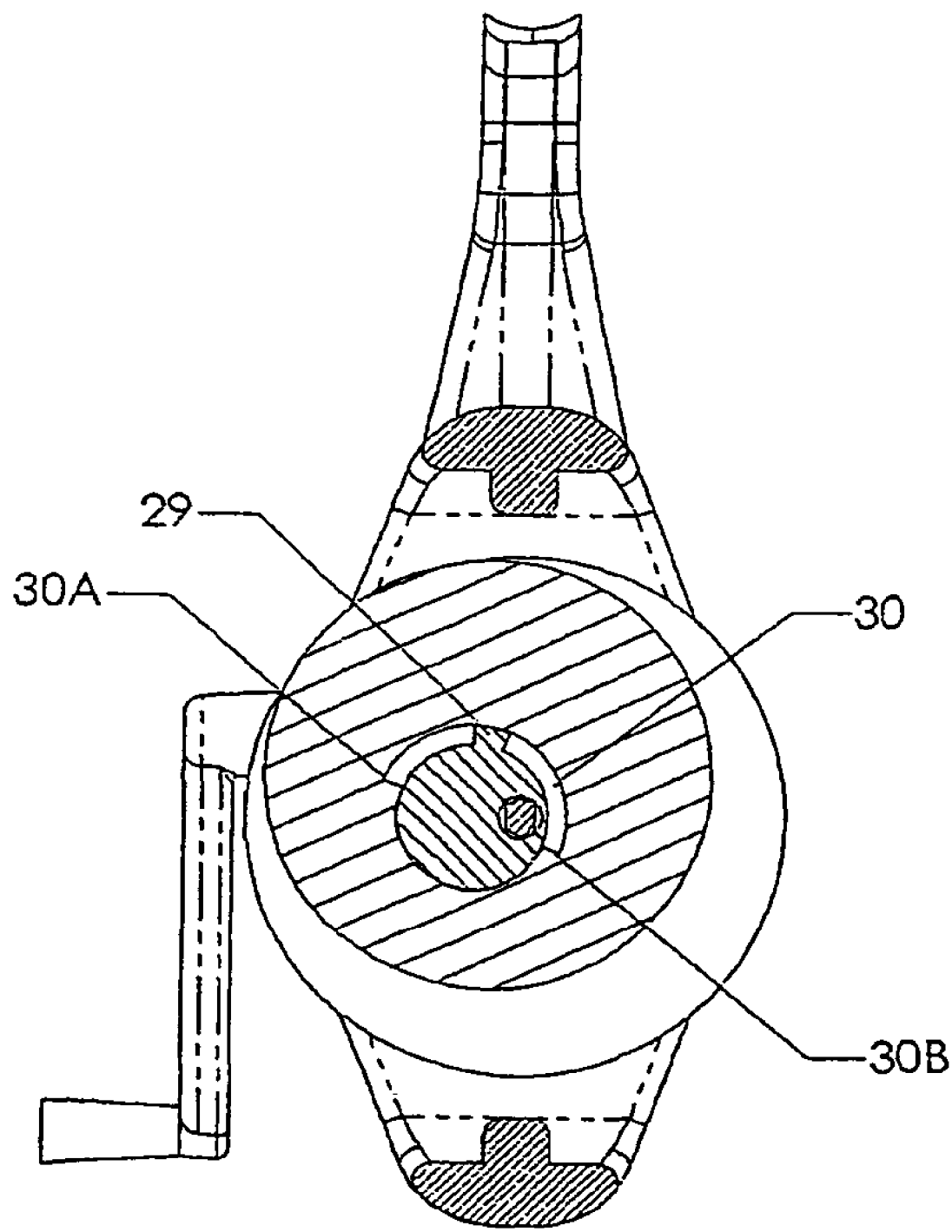
FIG. 10B: is a cross-section though the spool which illustrates the manner in which the stops limit relative movement between the spool and spool base.

As shown in FIG. 10B stop 29 on spindle 7 may move within arcuate groove 30 to abut stops 30A and 30B at either end of travel. This limits movement within a range of 180° of relative movement.

In use spool 5 may be moved to a desired eccentric position and secured by a clutch. Whilst the spool is secured in an eccentric position winding of the line on spool 5 will result in a "jigging" action of the lure. When a fish is hooked a load is applied to the line and, when the load is sufficient to overcome the resistance of the clutch, spool 5 is forced back to the concentric position as shown in FIG. 8. Line can then run smoothly from the reel, utilising a drag control if desired, or be wound in smoothly to retrieve a fish. The arrangement described allows a user to position spool 5 with a desired amount of eccentricity with respect to the winding axis. It may then be secured in place by the clutch.

A number of clutch mechanisms could be employed but a preferred arrangement will now be described with reference to FIG. 6. A plate 16 is mounted at a fixed position along shaft 9. Spool base 6 is mounted adjacent plate 16 with shaft 9 passing through bore 8. A sheet 11 having a frictional surface is sandwiched between plate 16 and spool base 6. Alternatively a frictional coating could be applied to either the surface of plate 16 adjacent spool 6 or the underside surface of spool base 6 adjacent plate 16 or both. Alternatively spool base 6 may mechanically engage with plate 16 to prevent relative rotation or some similar arrangement may be employed.

Spool 5 is mounted to spool base 6 by spindle 7 passing through bore 10. The underside of spool 5 or the surface of spool base 6 adjacent spool 5, or both, are provided with a frictional coating to act as a clutch plate. Alternatively a separate clutch plate may be provided between the spool 5 and spool base 6. Washer 12 is then placed upon a threaded end of shaft 9 and a compression means in the form of knob 13, spring 14 and nut 15 is then secured. A frictional surface may be provided between washer 12 and spool 5 also. Spring 14 and nut 15 are located within knob 13. Knob 13 may be rotated by a user so as to fasten or unfasten nut 15. As nut 15 is fastened and unfastened spring 14 applies a greater or lesser compressive force between spool base 6 and spool 5. Due to the frictional surface between spool 5 and spool base 6 and between washer 12 and spool 5 the force required to rotate spool 5 varies according to the compressive force applied by spring 14. It will be appreciated that acceptable performance may be achieved utilising only one such frictional surface. The frictional surface may suitably be PTFE tape. A circlip 28 may be provided to contain nut 15 and spring 14 within knob 13.

Accordingly, by adjustment of knob 13 a user can secure spool 5 in a desired position and set the compressive force applied between spool 5 and spool base 6 by adjusting knob 13. Adjusting the compressive force applied between spool 5 and spool base 6 allows a user to set the line loading at which the spool may move from an eccentric to a substantially concentric position.

In use knob 13 may be rotated to loosen the compression means formed by spring 14 and nut 15. Spool 5 may then be rotated about spindle 7 to a desired eccentric position. Knob 13 may then be adjusted until nut 15 compresses spring 14 to apply a desired compressive force. A lure may then be cast and wound in in the normal manner. Due to the eccentric position of spool 5 line will be wound at a variable speed to produce a "jigging" action.

When a fish takes the lure a number of events happen in sequence. Torque is applied to spool 5 by the fishing line as the fish loads the line. As the torque increases spool 5 overcomes the frictional resistance and rotates about spindle 7 until stop 30 engages stop 30A of spool base 6.

Once spool 5 assumes the concentric position spool 5 and spool base 6 rotate about shaft 9. The amount of drag (i.e. resistance to rotation of spool 5 and spool base 6 about shaft 9) may be adjusted by adjusting the compressive force applied by spring 14 by adjusting the position of nut 15. Where a drag control mechanism is employed which controls rotation of shaft 9, spool base 6 may be fixed to shaft 9 and the drag may be adjusted via a drag control knob of the fishing reel. With spool 5 in its concentric position line may be wound in at a uniform rate.

Figure 11:
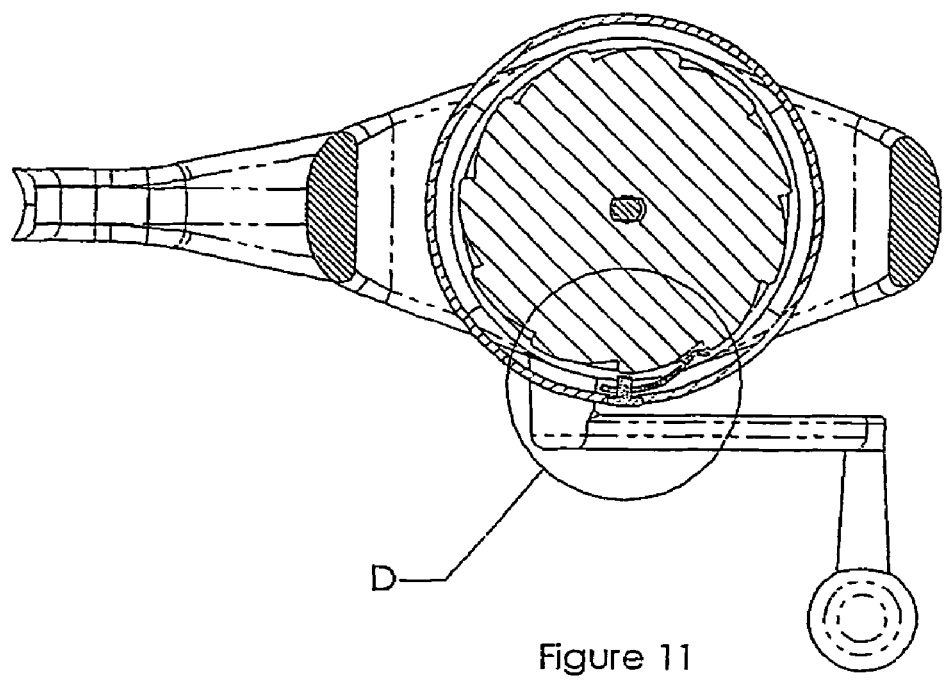
FIG. 11: shows a view of the fishing reel of FIGS. 1–10 along section C—C.
Figure 12:
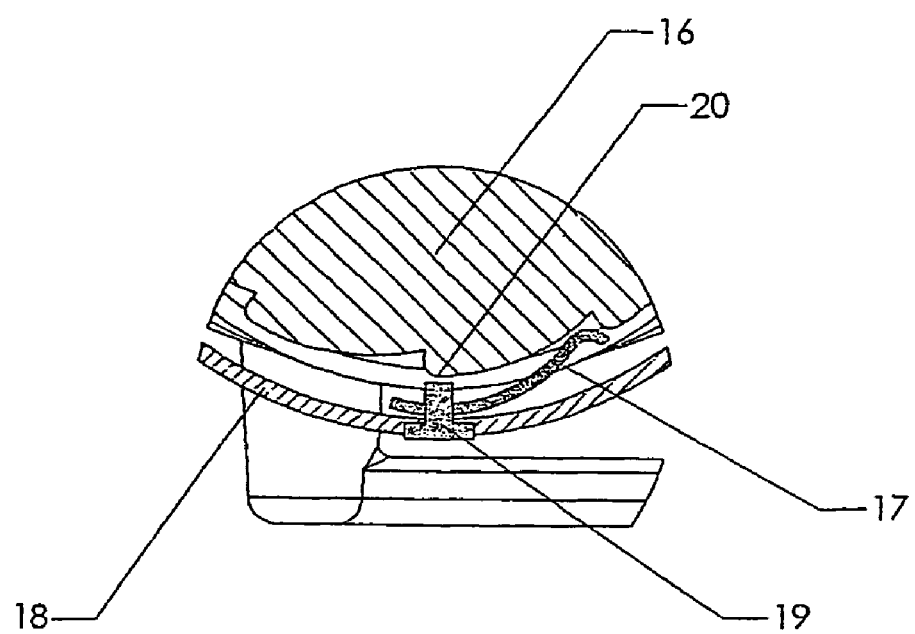
FIG. 12: shows detail of the region D of the clicker shown FIG. 11.

Referring now to FIGS. 11 and 12 a clicker mechanism is shown. The clicker mechanism produces a clicking noise when spool base 6 rotates relative to gear housing 18. In the embodiment shown in FIGS. 11 and 12 a clicker plate 16 is fixed to shaft 9 and a flexible strip 17 is affixed to the gear housing 18 by a rivet 19. As gear housing 18 rotates flexible strip 17 clicks as it passes over the teeth 20 of clicker wheel 16. It will be appreciated that an opposite arrangement may also be employed where serrations are provided about the interior surface of gear housing 18 and a flexible strip extends from clicker plate 16.

Figure 13:
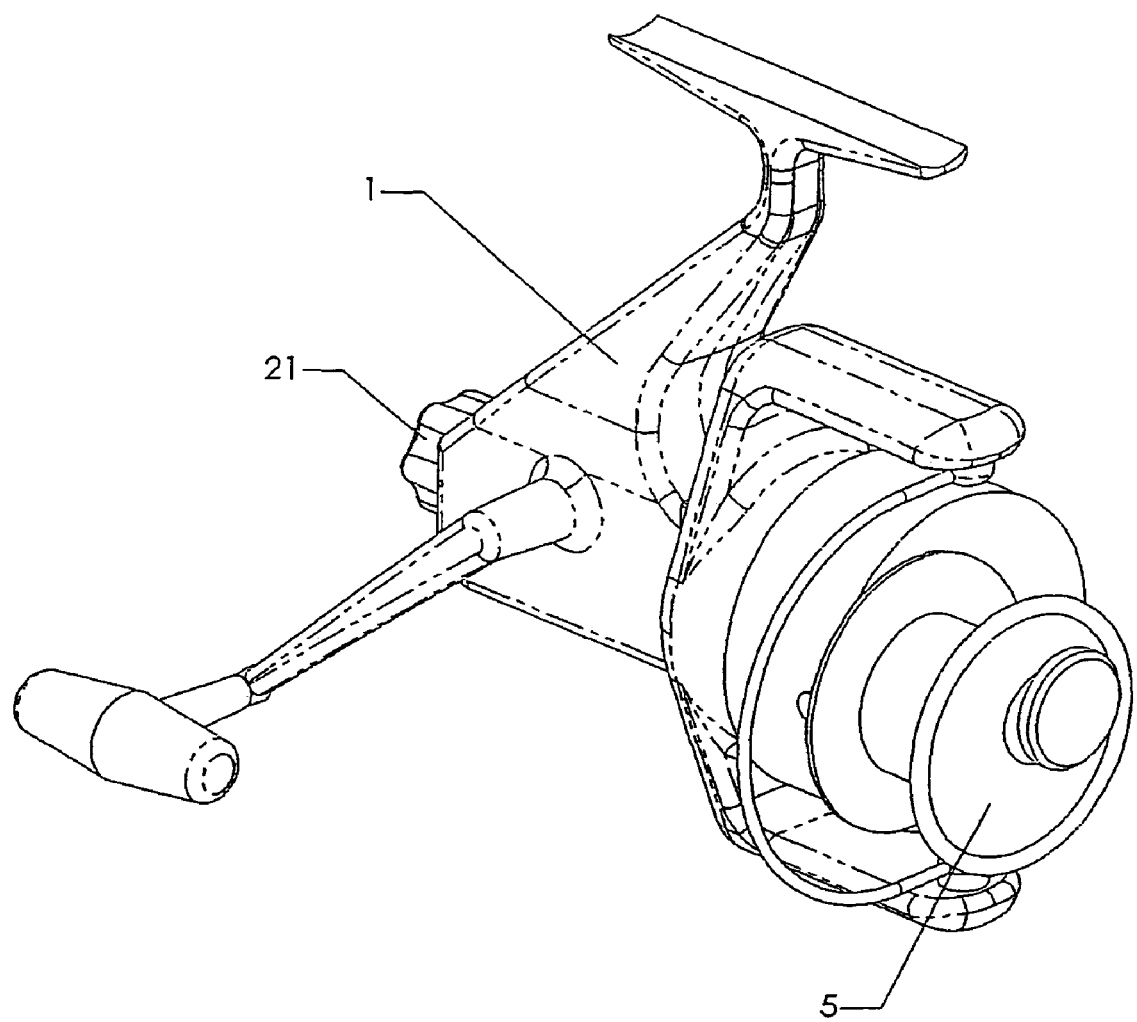
FIG. 13: shows a fishing reel according to a second embodiment in which the variable compression means includes a knob located at the rear of the fishing reel.
Figure 14:
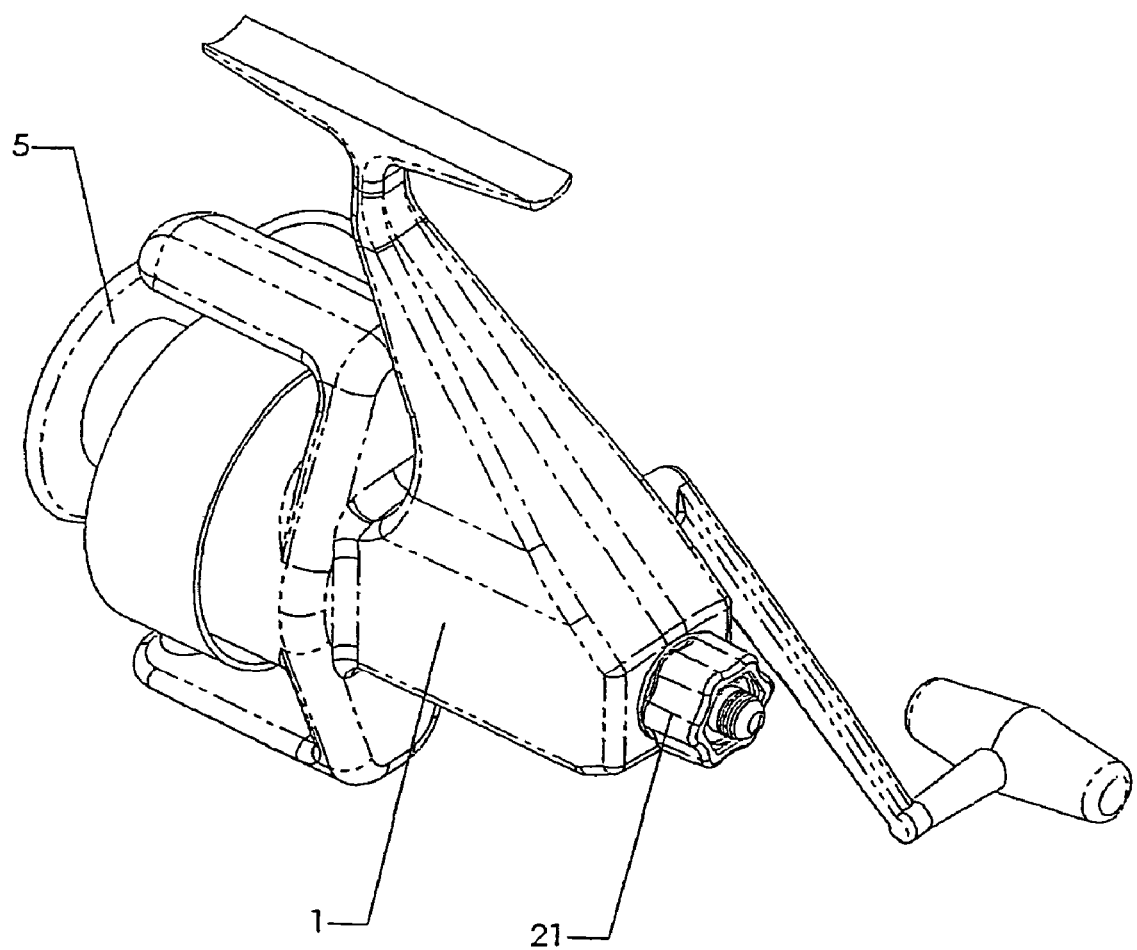
FIG. 14: shows a rear side perspective view of the fishing reel of FIG. 13.
Figure 15:
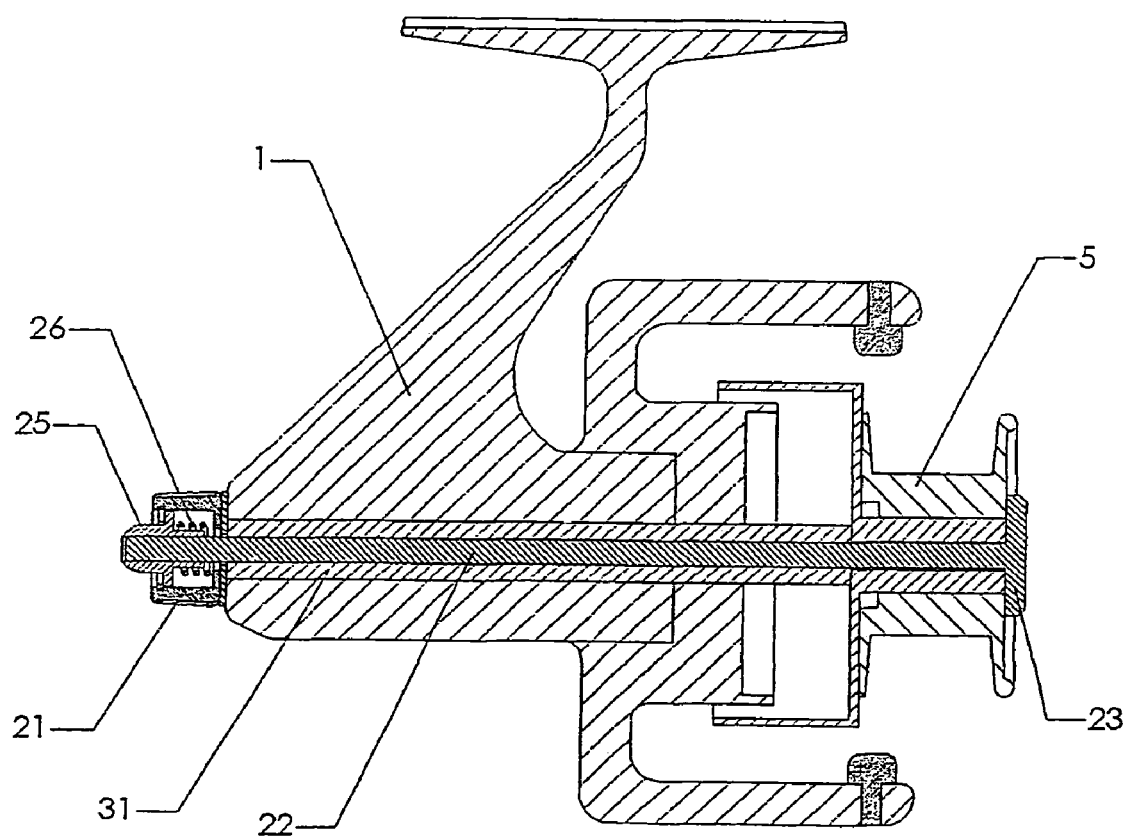
FIG. 15: shows a side cross-sectional view of the reel of FIGS. 13 and 14.

Referring now to FIGS. 13 to 15 an alternative embodiment is shown in which a rear knob 21 is used to adjust the clutch. The mechanism is substantially the same as that shown in relation to FIGS. 1–12 except that the form of the variable compression means has been modified for rear adjustment. In this case shaft 22 extends through tube 31 and has a flat head 23 for applying compressive force to spool 5. As in the previous embodiment knob 21 rotates nut 25 on a threaded end of shaft 22 to adjust the compression of spring 26. This arrangement makes adjustment of knob 21 easier for some configurations and removes any obstruction from the front of spool 5. A separate drag control mechanism may be provided with a separate drag control knob.

Figure 16:
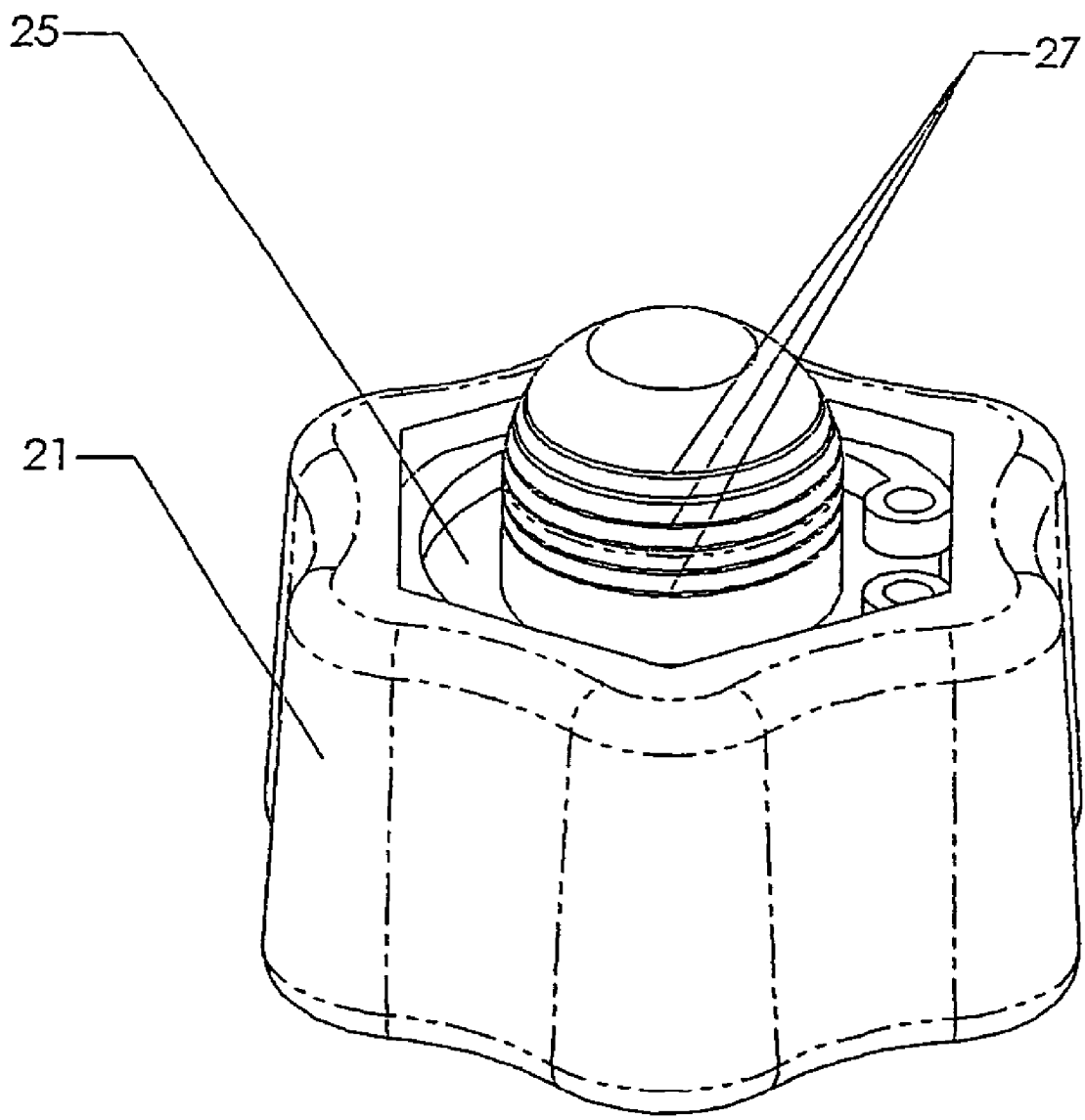
FIG. 16: shows a knob including visual indication markings.

Referring now to FIG. 16 a knob 24 including a visual indication means is shown. In this case a number of lines 27 are indicated on an end of nut 25 to enable a user to see the extent to which spring 26 has been compressed by the position of nut 25 with respect to knob 24. This enables a user to set a desired threshold at which the spool may move from an eccentric to a concentric position based on visual markings. This arrangement may be utilised for knob 13 shown in relation to FIGS. 1–12 also.

The invention provides a fishing reel of simple construction that allows a user to set a desired amount of "jigging" and to set the force required to move the spool from an eccentric to a concentric position.

Where in the foregoing description reference has been made to integers or components having known equivalents then such equivalents are herein incorporated as if individually set forth.

Although this invention has been described by way of example it is to be appreciated that improvements and/or modifications may be made thereto without departing from the scope or spirit of the present invention.

The invention claimed is:

1. A fishing reel including:
   a reel body;
   a rod attachment leg adapted to be mounted to a fishing rod;
   a spool for storing and dispensing line; and
   a winding mechanism configured for winding line onto the spool about a winding axis, wherein the spool includes a spool axis and the spool is configured to be releasably secured to a securing member in any one of a plurality of positions, wherein the spool axis in each of the plurality of positions is eccentrically offset from the winding axis to a different degree.

2. A fishing reel as claimed in claim 1 wherein the winding mechanism includes an arm that is rotatable about the winding axis to wind line onto the reel.

3. A fishing reel as claimed in claim 1 wherein the degree of eccentricity of the spool is continuously adjustable between a most eccentric position and a concentric position.

4. A fishing reel as claimed in claim 1 wherein the spool is rotatable about a spindle and is limited to a permitted range of rotation with respect to the spindle.

5. A fishing reel as claimed in claim 4 wherein the permitted range of rotation is less than 180 degrees.

6. A fishing reel as claimed in claim 1 wherein the spool has an eccentrically located bore and is rotatable about a spindle positioned along an axis offset from the winding axis.

7. A fishing reel as claimed in claim 1 wherein the spool moves from an eccentric to a concentric position when the torque applied to the spool exceeds a set threshold.

8. A fishing reel as claimed in claim 1, wherein said securing member is an adjustable clutch for securing the spool in a desired position.

9. A fishing reel as claimed in claim 8 wherein the clutch includes a clutch plate between the spool and a spool base.

10. A fishing reel as claimed in claim 9 including a variable compression means for applying an adjustable compressive force between the spool and the spool base.

11. A fishing reel as claimed in claim 10 wherein the variable compression means includes a spring.

12. A fishing reel as claimed in claim 10 wherein the variable compression means includes a threaded shaft secured to the spool base passing through the spindle and a nut provided at the free end for adjusting the compressive force applied.

13. A fishing reel as claimed in claim 12 wherein the nut is surrounded by a knob including means for visually indicating the compressive force applied by the spring.

14. A fishing reel as claimed in claim 1 including a clicker in the form of a flexible strip mounted to a stationary part of the reel which engages projections of a rotating part of the reel.

15. A fishing reel as claimed in claim 1 including a clicker in the form of a flexible strip mounted to a rotating part of the reel which engages projections of a stationary part of the reel.

16. A spool and spool base for a fishing reel, a reel body; and a rod attachment leg adapted to be mounted to a fishing rod; wherein the spool includes a spool axis and the spool is configured to be releasably secured to a securing member in any one of a plurality of positions, wherein the spool axis in each of the plurality of positions is eccentrically offset from the winding axis to a different degree.

17. A spool and spool base as claimed in claim 16 wherein the spool is continuously adjustable in use between a most eccentric position and a concentric position.

18. A spool and spool base as claimed in claim 16 wherein the spool is rotatable about a spindle and is limited to a permitted range of rotation with respect to the spindle.

19. A spool and spool base as claimed in claim 18 wherein the permitted range of rotation is less than 180°.

20. A spool and spool base as claimed in claim 16 wherein said securing member comprises at least one of adjacent surfaces of at least one of the spool and spool base having a frictional surface.

21. A spool and spool base as claimed in claim 16 wherein said securing member comprises a clutch plate between the spool and the spool base.

22. A combination including a spool and spool base as claimed in claim 16 and a variable compression means for applying an adjustable compressive force between the spool and spool base in use.

23. A combination as claimed in claim 22 wherein the variable compression means includes a spring.

24. A combination as claimed in claim 22 wherein the compression means includes a nut surrounded by a knob for adjusting the nut.

25. A combination as claimed in claim 22 wherein the variable compression means includes means for visually indicating the compressive force applied by the spring.

\* \* \* \* \*